(12) United States Patent
Zhang et al.

(10) Patent No.: US 7,885,463 B2
(45) Date of Patent: Feb. 8, 2011

(54) IMAGE SEGMENTATION USING SPATIAL-COLOR GAUSSIAN MIXTURE MODELS

(75) Inventors: Cha Zhang, Sammamish, WA (US); Michael Cohen, Seattle, WA (US); Yong Rui, Sammamish, WA (US); Ting Yu, Evanston, IL (US)

(73) Assignee: Microsoft Corp., Redmond, WA (US)

( * ) Notice: Subject to any disclaimer, the term of this patent is extended or adjusted under 35 U.S.C. 154(b) by 1027 days.

(21) Appl. No.: 11/393,576

(22) Filed: Mar. 30, 2006

(65) Prior Publication Data

US 2007/0237393 A1 Oct. 11, 2007

(51) Int. Cl.
G06K 9/34 (2006.01)
(52) U.S. Cl. ..................................... 382/173
(58) Field of Classification Search .................. 382/173
See application file for complete search history.

(56) References Cited

U.S. PATENT DOCUMENTS

| | | | | |
|---|---|---|---|---|
| 6,973,212 | B2 * | 12/2005 | Boykov et al. ............... | 382/173 |
| 2006/0285747 | A1 * | 12/2006 | Blake et al. .................. | 382/180 |

OTHER PUBLICATIONS

C. Rother, V. Kolmogorov, and A. Blake. Grabcut—interactive foreground extraction using iterated graph cuts. Proc. ACM Siggraph, 2004.*
Kolmogorov, Vladimir, Antonio Criminisi, Andrew Blake, Geoff Cross, and Carsten Rother. "Bi-Layer Segmentation of Binocular Stereo Video." CVPR (2). 2005, 407-414.*
Bergen, J., P. Burt, R. Hingorani, and S. Peleg, A three-frame algorithm for estimating two-component image motion, IEEE Trans. on Pattern Analysis and Machine Intelligence, pp. 886-895, vol. 14, No. 9.
Boykov, Y. and Jolly, M.-P., Interactive graph cuts for optimal boundary and region segmentation of objects in N-D images, Int'l Conf. on Computer Vision, (ICCV), 2001, pp. 105-112, vol. I.
Boykov, Y., O. Veksler, R. Zabih, Fast approximate energy minimization via graph cuts, IEEE Trans. on Pattern Analysis and Machine Intelligence (PAMI), 2001, pp. 1222-1239, vol. 23, No. 11.
Comaniciu, D., V. Ramesh, and P. Meer, Real-time tracking of non-rigid objects using mean shift, Proc. IEEE Int'l Conf. on Comp. Vision and Pattern Recognition (CVPR), 2000, pp. 142-149, vol. 2.
Elgammal, A., and L. S. Davis, Probabilistic framework for segmenting people under occlusion, Proc. IEEE Int'l on Comp. Vision, (ICCV), 2001, pp. 145-152, vol. 2.
Elgammal, A., D. Harwood, and L. S. Davis, Non-parametric model for background subtraction, European Conf. on Comp. Vision, 2000, pp. 751-767.
Fan, Z., Y. Wu, M. Yang, Multiple collaborative kernel tracking, Proc. of the 2005 IEEE Comp. Soc. Conf. on Comp. Vision and Pattern Recognition (CVPR'05), 2005, pp. 502-509, vol. 2.
Friedman, N., and S. Russell, Image segmentation in video sequences: A probabilistic approach, Proc. of the 13th Conf. on Uncertainty in Artificial Intelligence, 1997, pp. 175-181.
Harville, M., A framework for high-level feedback to adaptive per-pixel, mixture-of-Gaussian background models, European Conf. on Comp. Vision, 2002, pp. 543-560, vol. 3.

(Continued)

*Primary Examiner*—Bhavesh M Mehta
*Assistant Examiner*—Nirav G Patel
(74) *Attorney, Agent, or Firm*—Lyon & Harr, LLP; Katrina A. Lyon

(57) ABSTRACT

A spatial-color Gaussian mixture model (SCGMM) image segmentation technique for segmenting images. The SCGMM image segmentation technique specifies foreground objects in the first frame of an image sequence, either manually or automatically. From the initial segmentation, the SCGMM segmentation system learns two spatial-color Gaussian mixture models (SCGMM) for the foreground and background objects. These models are built into a first-order Markov random field (MRF) energy function. The minimization of the energy function leads to a binary segmentation of the images in the image sequence, which can be solved efficiently using a conventional graph cut procedure.

16 Claims, 9 Drawing Sheets

OTHER PUBLICATIONS

Jojic, N., and B. Frey, Learning flexible sprites in video layers, Proc. IEEE Int'l Conf on Comp. Vision and Pattern Recognition, (CVPR), 2001, pp. 199-206, vol. 1.

Khan, S., and M. Shah, Object based segmentation of video using color, motion and spatial information, Proc. IEEE Int'l Conf on Comp. Vision and Pattern Recognition, 2001, pp. 746-751, vol. 2.

Kolmogorov, V., A. Criminisi, A. Blake, G. Cross and C. Rother, Bi-layer segmentation of binocular stereo vision, Comp. Vision and Pattern Recognition, 2005, pp. 407-414, vol. 2.

Kolmogorov, V. and R. Zabih, What energy functions can be minimized via graph cuts?, IEEE Trans. on Pattern Analysis and Mach. Intelligence, Feb. 2004, pp. 147-159, vol. 26, No. 2.

Mittal, A., and N. Paragois, Motion-based background subtraction using adaptive kernel density estimation, Comp. Vision and Pattern Recognition, 2004, pp. 302-309.

Rittscher, J., J. Kato, S. Joga, and A. Blake, A probabilistic background model for tracking, European Conf. on Comp. Vision, 2000, pp. 336-350, vol. 2.

Rother, C., V. Kolmogorov, A. Blake, "GrabCut": interactive foreground extraction using iterated graph cuts, ACM Transactions on Graphics, Aug. 2004, pp. 309-314, vol. 23, No. 3.

Stauffer, C., and W. E. L. Grimson, Adaptive background mixture models for real-time tracking, Comp. Vision and Pattern Recognition, 1999, pp. 246-252, vol. 2.

Tao, H., H. Sawhney, and R. Kumar, Object tracking with bayesian estimation of dynamic layer representations, IEEE Trans. on Pattern Analysis and Mach. Intelligence, 2002, pp. 75-89, vol. 24.

Torr, P. H. S., R. Szeliski, and P. Anandan, An integrated bayesian approach to layer extraction from image sequences, IEEE Trans. on Pattern Analysis and Mach. Intelligence, Mar. 2001, pp. 297-303, vol. 23, No. 3.

Toyama, K., J. Krumm, B. Brumitt, and B. Meyers, Wallflower: Principles and practice of background maintenance, Proc. Int'l Conf. on Computer Vision, ICCV, Sep. 1999, pp. 255-261, Corfu, Greece.

Wang, J., and Adelson, E., Representing moving images with layers. IEEE Trans. Image Processing, Sep. 1994, pp. 625-638, vol. 3, No. 5.

Wren, C., A. Azarbayejani, T. Darrel, and A. Pentland, Pfinder: Real time tracking of the human body, IEEE Trans. on PAMI, 1997, vol. 19, No. 7, pp. 780-785.

Xiao, J., and M. Shah, Motion layer extraction in the presence of occlusion using graph cut, IEEE Trans. on Pattern Analysis and Machine Intelligence, 2004, vol. 2, pp. 972-979.

ZhenQiu Zhang MingJing Li Li, S.Z. HongJiang Zhang, Multi-view face detection with FloatBoost, Proceedings of the Sixth IEEE Workshop on Applications of Computer Vision, 2004, pp. 184-188, Beckman Inst., Illinois Univ., Urbana-Champaign, IL, USA.

\* cited by examiner

IMAGE SEGMENTATION USING SPATIAL-COLOR GAUSSIAN MIXTURE MODELS

BACKGROUND

Segmenting foreground objects from the background in videos is of great interest in many imaging applications. In video conferencing, once the foreground and background are separated, the background can be replaced by another image, which can beautify the video and protect privacy. The segmented foreground can be compressed and transmitted more efficiently, for example, by using object-based video coding. As an advanced video editing tool, segmentation also allows people to combine multiple objects from different videos and create new and artistic results.

The foreground/background segmentation problem for monocular videos, videos captured with a single camera, has been studied in depth. One area of interest in videos captured by static or hand-held cameras is the filming of large moving non-rigid foreground objects. For instance, the foreground can be the head and shoulders of a talking person, or a dancing character. Typically a static background is not assumed in such a scenario, because the camera can be shaking and there can be moving objects in the background. On the other hand, it is typically assumed that the background objects stay roughly where they are, which excludes videos captured by a continuously-panning hand-held camera. The main challenges in such types of sequences are that part of the foreground and background objects may share similar colors. Additionally, the foreground objects are typically large, hence there can be substantial occlusions between the foreground and background objects. Lastly, the foreground objects are non-rigid. The motion patterns of the foreground objects can be very complex or rapid, which can easily cause confusion to the segmentation algorithm if they are not modeled correctly.

Unlike some works which utilize the depth information reconstructed from a stereo camera pair, monocular video foreground/background segmentation is under-constrained. One additional assumption that makes the monocular video foreground/background segmentation problem fully constrained is that the background scene is static and known a priori. In this case the segmentation problem becomes a background modeling and subtraction problem, which can be solved effectively by pixel level modeling using Gaussian distributions, mixture of Gaussians, non-parametric kernel density estimators and three state Hidden Markov Models (HMMs). A separate region-level or even object-level model can be added to improve the background modeling quality in dynamic scenes. Nevertheless, video segmentation based on background modeling can still be confused by moving background objects or motionless foreground objects.

Another popular assumption made in video segmentation is that the foreground and background objects have different motion patterns. Research in this category, termed layer-based motion segmentation (LBMS), has received much interest in past years. In LBMS, the general objective is to automatically extract the motion coherent regions with relative depth estimations. Primarily focusing on the general motion segmentation problem, existing approaches in LBMS are either computationally very expensive, requiring off-line learning and processing, or tend to generate many over-segmented regions. Thus, it is hard to form semantically meaningful objects using LBMS.

SUMMARY

The Spatial-Color Gaussian Mixture Model (SCGMM) image segmentation technique described herein addresses the foreground/background monocular video segmentation problem using a new technique called joint SCGMM tracking. The method is designed for videos captured by static or hand-held cameras filming large moving non-rigid foreground objects. A static background is not assumed. On the other hand, it is assumed that background objects stay roughly where they are.

The present SCGMM image segmentation technique specifies foreground objects in the first frame of an image or video sequence, either manually or automatically. The SCGMM image segmentation technique then learns two SCGMM models, one for each of the foreground and background objects. These models are built into a first-order Markov random field (MRF) energy function. The minimization of the energy function leads to a binary segmentation of the video frames, which can be solved efficiently using a conventional graph cut procedure.

While it is well known that SCGMM has more discrimination power than color-only GMM models, in video segmentation a problem of propagating the SCGMM models across video frames exists, because both foreground and background objects can have complex and rapid motion. Using a foreground/background joint SCGMM tracking procedure, the SCGMM models from the previous frame are propagated to the current one given a new input image. More specifically, the SCGMM segmentation technique first combines the foreground and background SCGMM models into a single generative model to depict the whole image, then adopts an Expectation-Maximization (EM) algorithm to update the model under the equality constraint that the color factors of each component remain unchanged.

Once the model of the whole image is updated via the joint SCGMM tracking procedure, the model is again split into updated foreground and background SCGMM models. The updated SCGMM models are then used to perform segmentation via graph cut, which is followed by a secondary SCGMM model update based on the segmentation results.

This SCGMM image segmentation technique and joint SCGMM tracking procedure cannot only handle complex or rapid motions of the foreground/background objects, but also help to resolve occlusion issues caused by their motion.

It is noted that while the foregoing limitations in existing video segmentation techniques described in the Background section can be resolved by a particular implementation of the SCGMM image segmentation system and process described, this system and process is in no way limited to implementations that just solve any or all of the noted disadvantages. Rather, the present system and process has a much wider application as will become evident from the descriptions to follow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The specific features, aspects, and advantages of the claimed subject matter will become better understood with regard to the following description, appended claims, and accompanying drawings where:

FIG. 7 depicts the first image in an image sequence, while FIG. 8 depicts a subsequent image. Light ellipses are foreground components, and red ellipses are background components.

FIG. 12 shows the face detection results where a face detector is used to identify the foreground objects. In FIG. 13 it is assumed that certain regions are definite foreground and background. White indicates foreground, black indicates background. FIG. 14 shows an image segmentation result using a graph cut procedure.

DETAILED DESCRIPTION

In the following description, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 The Computing Environment.

Before providing a description of embodiments of the present SCGMM image segmentation technique, a brief, general description of a suitable computing environment in which portions of the technique may be implemented will be described. The technique is operational with numerous general purpose or special purpose computing system environments or configurations. Examples of well known computing systems, environments, and/or configurations that may be suitable for use with the process include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
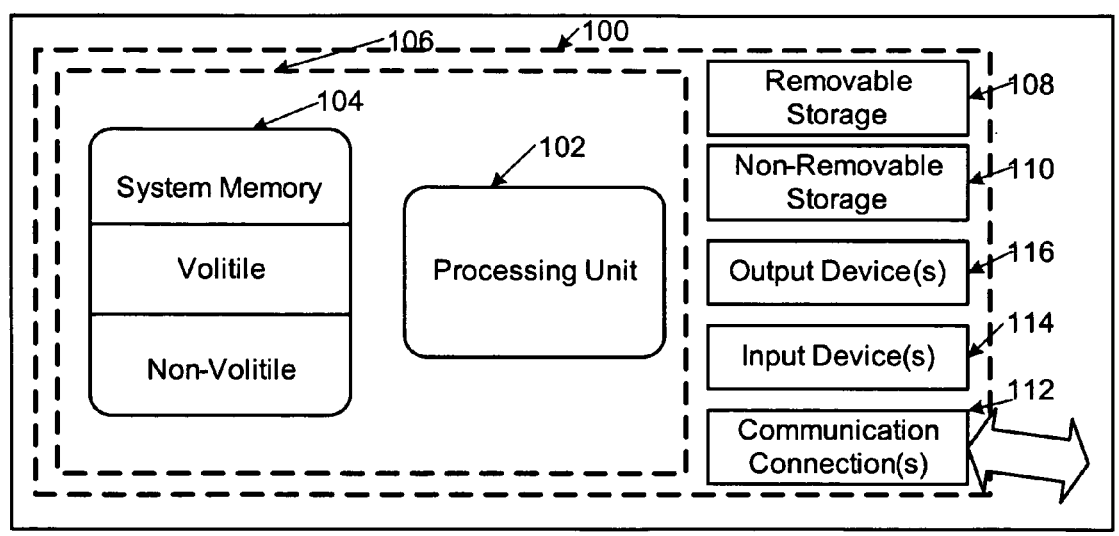
FIG. 1 is a diagram depicting a general purpose computing device constituting an exemplary system for implementing the present SCGMM image segmentation technique.

FIG. 1 illustrates an example of a suitable computing system environment. The computing system environment is only one example of a suitable computing environment and is not intended to suggest any limitation as to the scope of use or functionality of the present system and process. Neither should the computing environment be interpreted as having any dependency or requirement relating to any one or combination of components illustrated in the exemplary operating environment. With reference to FIG. 1, an exemplary system for implementing the present process includes a computing device, such as computing device 100. In its most basic configuration, computing device 100 typically includes at least one processing unit 102 and memory 104. Depending on the exact configuration and type of computing device, memory 104 may be volatile (such as RAM), nonvolatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. In particular, one such input device is a camera, for example a video camera. Output device(s) 116 such as a display, speakers, printer, etc. may also be included. All these devices are well know in the art and need not be discussed at length here.

The present process may be described in the general context of computer-executable instructions, such as program modules, being executed by a computing device. Generally, program modules include routines, programs, objects, components, data structures, etc. that perform particular tasks or implement particular abstract data types. The process may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the invention.

2.0 Segmentation by Tracking Spatial-Color Gaussian Mixture Models.

Details of the SCGMM image segmentation technique including a system and process are described in the following sections. It should be noted that the embodiments described are exemplary in nature and other types of hybrid may be created based on the principles described herein.

2.1 System and Process Overview.

Figure 2:
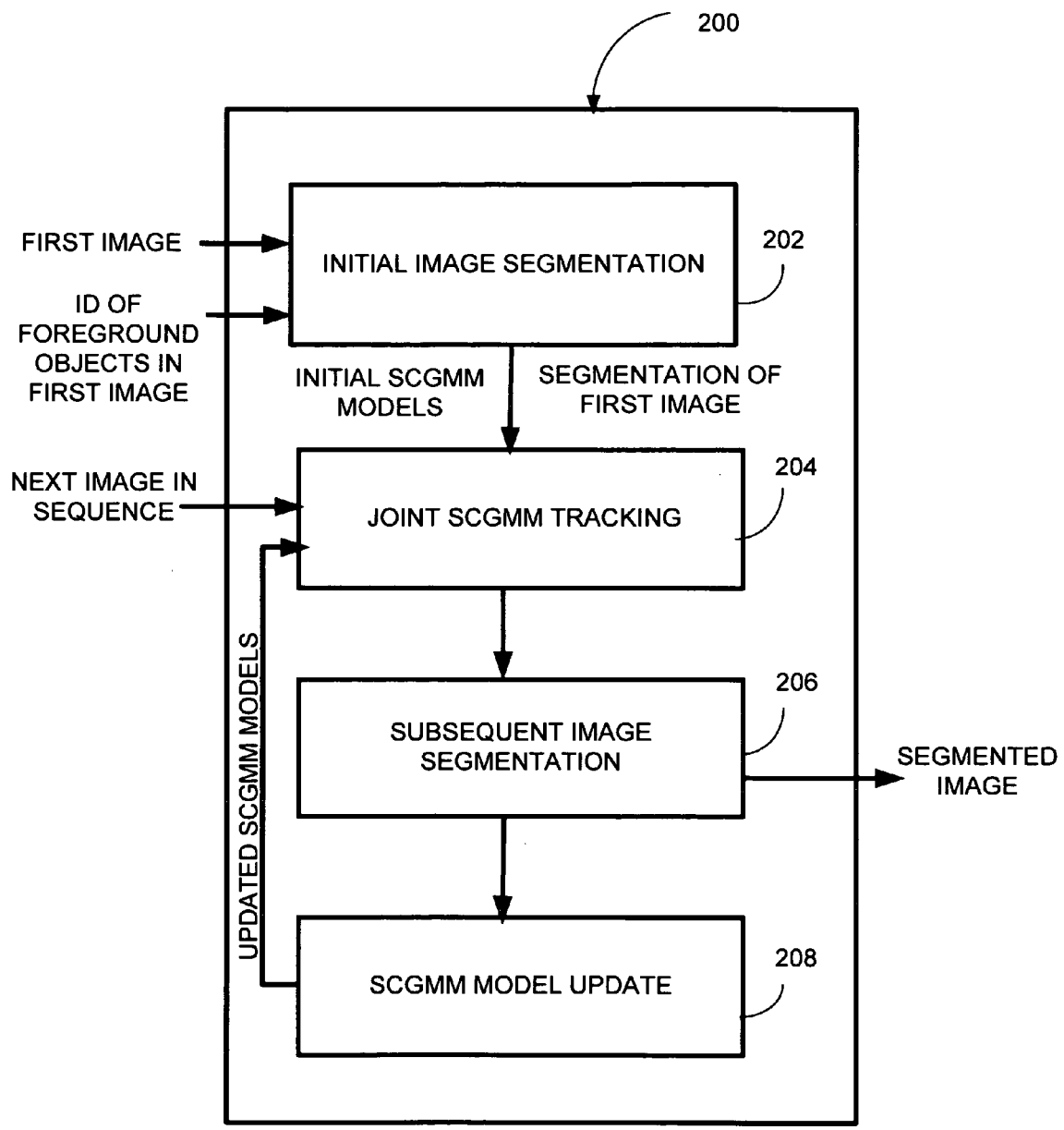
FIG. 2 depicts an exemplary flow diagram of one embodiment of the SCGMM image segmentation system described herein.

An exemplary embodiment of the SCGMM image segmentation system 200 described herein is shown in FIG. 2. In general, the system includes an initial image segmentation module 202, a joint SCGMM tracking module 204, a subsequent image segmentation module 206 and a SCGMM model update module 208. Foreground objects are specified in the first frame of an image sequence that is input into the initial image segmentation module 202. This module 202 outputs initial SCGMM models for both foreground and background objects, as well as a segmentation of the first image frame. This segmentation can be obtained using a conventional graph cut algorithm, which minimizes a Markov random field energy function containing the SCGMM models. Once the system is initialized the next image in the sequence can be input. Joint SCGMM tracking of the foreground and background SCGMM models from the initial (or previous) frame to the newly input frame is performed in the joint SCGMM tracking module 204 which updates the SCGMM models. Segmentation of the newly input image occurs in the subsequent image segmentation module 206. The subsequent image segmentation module 206 segments the newly input image using a graph cut algorithm which minimizes a Markov random field energy function containing the updated SCGMM models and outputs the segmented image. The SCGMM model update module 208 further updates the SCGMM models based on the segmentation result of the output image.

Figure 3:
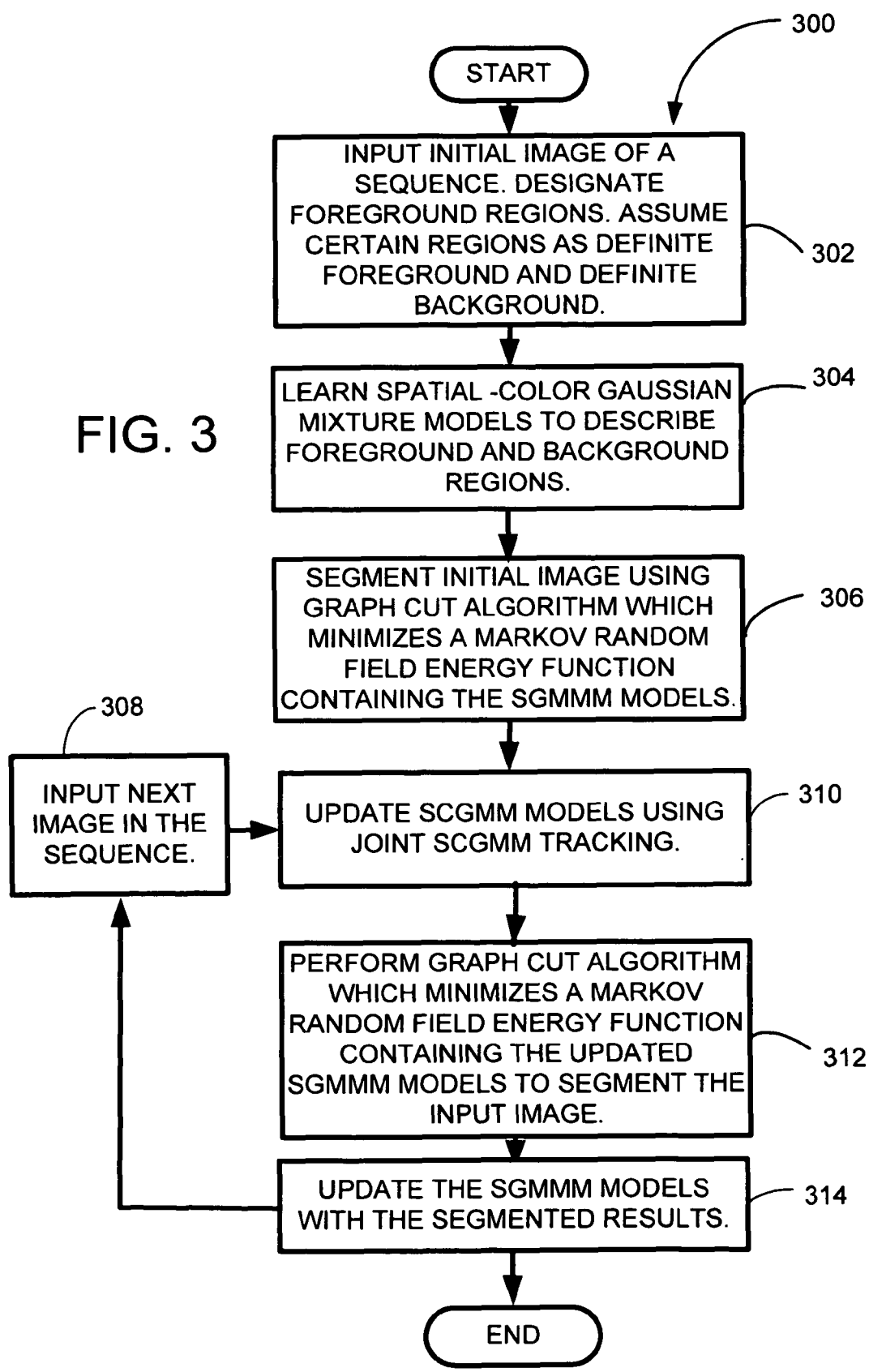
FIG. 3 depicts an exemplary flow diagram of one embodiment of the SCGMM image segmentation process described herein.

FIG. 3 depicts one embodiment of the SCGMM image segmentation process 300 described herein. As shown in process action 302, foreground objects are specified in a first frame of an image sequence. Foreground objects can be specified either manually or automatically. In video teleconferencing, the foreground object can be extracted by using a modern object detector (for example, in finding a face, a face detector can be used). Given the detected foreground object, the present SCGMM image segmentation technique assumes certain objects or regions are definite foreground and background. As shown in process action 304, spatial-color Gaussian mixture models are then learned to describe the foreground and background objects/regions. Segmentation of the image is obtained using a conventional graph cut algorithm, as shown in process action 306, which minimizes a Markov random field energy function containing the SCGMM models. A new image of the video sequence is then input (process action 308). For each new input frame, the SCGMM models are first updated using joint SCGMM tracking (process action 310). Then a graph cut procedure is performed that again minimizes a Markov random field energy function containing the SCGMM models (process action 312). Finally, the SCGMM is updated again with the segmented results, as shown in process action 314. It should be noted that the post-update of the SCGMM could also be constrained in order to improve the robustness of the segmentation to background camouflages. For example, the color components can be constrained to remain the same and only the spatial positions of the SCGMM components are updated.

Figure 4:
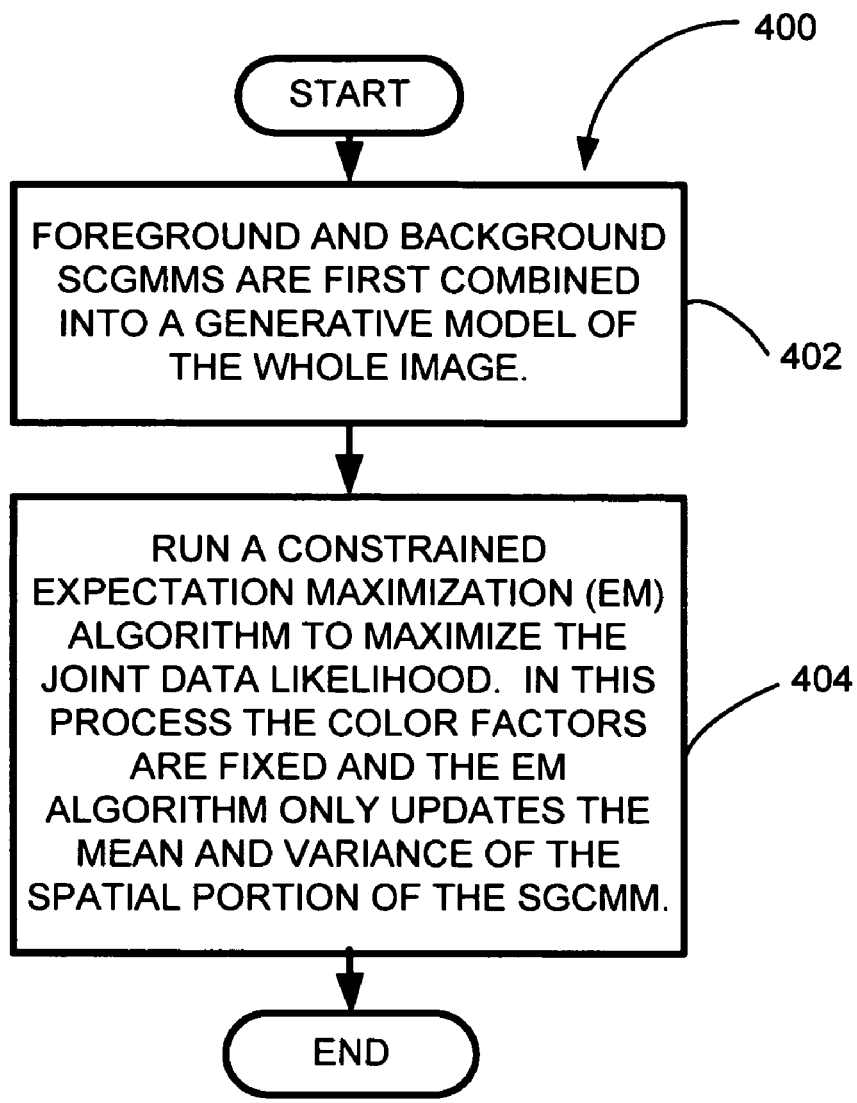
FIG. 4 depicts an exemplary flow diagram of the SCGMM tracking procedure described herein.
Figure 5:
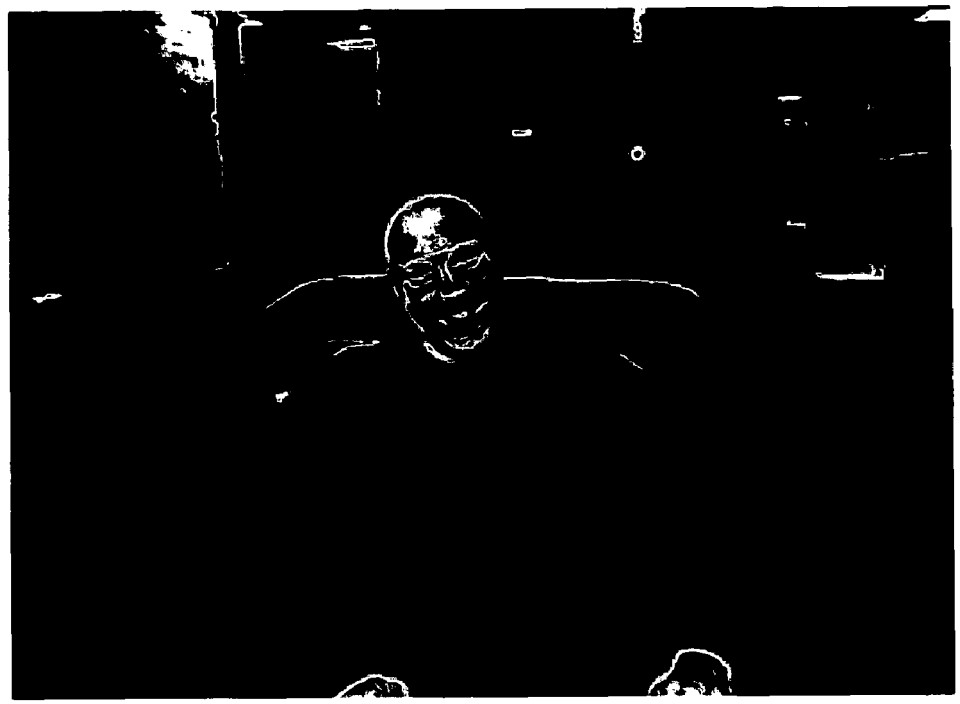
FIG. 5 depicts the first frame of the image sequence JM.

As shown in FIG. 4, one embodiment of the joint SCGMM tracking procedure works as follows. The foreground and background SCGMM models are first combined into a generative model of the whole image (process action 402). A constrained Expectation-Maximization (EM) algorithm is then run to maximize the joint data likelihood (process action 404). In this process, the color factors are fixed, and the EM algorithm only updates the mean and variance of the spatial portion of the SCGMM. It is equivalent to a gradient-based color tracker. This joint SCGMM tracking module will be described in more detail in Section 2.3.

Exemplary embodiments of the SCGMM image segmentation system and process having been described, the details of various aspects of the SCGMM image segmentation system and process are discussed in greater detail below. It should be noted that the following details are to aid in the understanding of the present SCGMM image segmentation technique and provide an exemplary implementation in mathematical terms. These details are in no way intended to limit the present SCGMM image segmentation technique to the specific implementation suggested.

2.2 Energy Minimization Formulation.

The SCGMM image segmentation technique described herein solves the foreground/background segmentation problem experienced in video using energy minimization. At any time instance t, let the feature vectors extracted from the video pixels be $z_{i,t}$, i=1, ..., N, where N is the number of pixels in each frame. Denote the unknown labeling of each pixel as $f_{i,t}$, i=1, ..., N, where $f_{i,t}$ is a binary variable, i.e., 0 and 1 in this case with $f_{i,t}=1$ representing pixel i labeled as foreground, and $f_{i,t}=0$ representing pixels labeled as background. In the following discussions, the subscript t is ignored where it can cause no confusion.

An energy-based objective function can be formulated over the unknown labeling variables of every pixel, $f_i$, i=1, ..., N, in the form of a first-order Markov random field (MRF) energy function:

$$E(f) = E_{data}(f) + \lambda E_{smooth}(f) \qquad (1)$$

$$= \sum_{p \in P} D_p(f_p) + \lambda \sum_{\{p,q\} \in \eta} V_{p,q}(f_p, f_q),$$

where $\eta$ denotes the set of 8-connected pair-wise neighboring pixels, P is the set of pixels in each image. The role of $\lambda$ is to balance the data and smooth cost. The above energy function can be efficiently minimized by a conventional two-way graph cut algorithm, where the two terminal nodes represent foreground and background labels respectively. The SCGMM image segmentation technique models the pair-wise smoothness energy term $E_{smooth}(f)$ as:

$$E_{smooth}(f) = \sum_{\{p,q\} \in \eta} V_{p,q}(f_p, f_q) \qquad (2)$$

$$= \sum_{\{p,q\} \in \eta} \frac{1}{d(p,q)} e^{-\frac{(l_p - l_q)^2}{2\sigma^2}}.$$

where $I_p$ denotes the intensity of pixel p, σ is the average intensity difference between neighboring pixels in the image, and d(p,q) is the distance between two pixels p and q, which has value 1 for horizontally or vertically connected pixel pairs, and $\sqrt{2}$ for diagonally connected pixel pairs. This smoothness constraint penalizes the labeling discontinuities of neighboring pixels if they have similar pixel intensities. It favors the segmentation boundary along regions where strong edges are detected.

The data energy term $E_{data}(f)$ models the likelihood of each pixel belonging to the foreground or background. In previous approaches for image segmentation, this term is often computed using Gaussian mixture models (GMM) in RGB color space. If one plotted the color distribution of foreground/background objects in the RGB space for the first frame of the test sequence JM, it would be seen that the foreground and background pixels have significant overlap in the RGB space, which leads to severe confusion for the data energy term. The SCGMM image segmentation technique employs a spatial-color GMM (SCGMM) model to overcome the confusion problem.

In one embodiment, the SCGMM image segmentation technique uses a five dimensional feature vector to describe each image pixel, i.e., $z_i$=(x,y,r,g,b), representing the pixel's spatial information, (x,y) coordinates, and color information, (r,g,b) color values. A five dimensional SCGMM model is obtained for each video frame (described in greater detail in Section 2.4), although other dimensions could conceivably be added. In this case, the likelihood of a pixel belonging to the foreground or background can be written as:

$$p(z\mid l) = \sum_{k=1}^{K_l} p_{l,k} G(z; \mu_{l,k}, \Sigma_{l,k}) \qquad (3)$$

where l ∈ {fg,bg}, representing foreground or background; $p_{l,k}$ is the weight of the $k_{th}$ Gaussian component in the mixture model, and $G(z; \mu_{l,k}, \Sigma_{l,k})$ is the $k_{th}$ Gaussian component as:

$$G(z; \mu_{l,k}, \Sigma_{l,k}) = \frac{1}{(2\pi)^{\frac{d}{2}} |\Sigma_{l,k}|^{\frac{1}{2}}} e^{-\frac{(z-\mu_{l,k})^T \Sigma_{l,k}^{-1} (z-\mu_{l,k})}{2}}, \qquad (4)$$

where d=5 is the dimension of the GMM models.

It is further assumed that the spatial and color components of the GMM models are decoupled, i.e., the covariance matrix of the Gaussian components take the block diagonal form, $$\Sigma_{l,k} = \begin{pmatrix} \Sigma_{l,k,s} & 0 \\ 0 & \Sigma_{l,k,c} \end{pmatrix},$$

where s and c stand for spatial and color component respectively. Under this assumption, each GMM Gaussian component has the following factorized form:

$$G(z;\mu_{l,k},\Sigma_{l,k}) = G(z;\mu_{l,k,s},\Sigma_{l,k,s}) G(z_c;\mu_{l,k,c},\Sigma_{l,k,c}). \qquad (5)$$

Figure 6:
FIG. 6 shows the spatial-color GMM model of the image shown in FIG. 5. Each ellipse represents a Gaussian component. The light ellipses are the foreground components; the dark ellipses are the background components.

The SCGMM model for the first frame of JM is shown in FIG. 6. Each ellipse represents a Gaussian component of the foreground (light ellipses) or background (dark ellipses). The thickness of each ellipse indicates the weight $p_{l,k}$ of each component. It can be seen that the foreground and background SCGMM models are spatially apart from each other, thus they have more discrimination power than the color-only GMMs.

Given the SCGMM models, the data cost $E_{data}(f)$ is defined as:

$$E_{data}(f) = \sum_{p \in P} D_p(f_p) \qquad (6)$$
$$= \sum_{p \in P} -\log p(z_p \mid f_p),$$

where $p(z_p|f_p)$ is computed using Equation 3.

The SCGMM image segmentation technique addresses the problem of motion between two sequential frames in an image sequence by using the joint SCGMM tracking procedure, which is described in greater detail in the next section. The present SCGMM image segmentation technique is the first to build SCGMM into a graph cut framework for video segmentation.

2.3 Joint SCGMM Tracking for Video Foreground/Background Segmentation.

As mentioned previously, it is assumed that the segmentation of the foreground/background objects in the first frame is available. Two SCGMM models can thus be learned from the initial segmentation using the popular EM algorithm, known to those with ordinary skill in the art, which maximizes the data likelihood of each segment, expressed in the form:

$$\theta_{l,0}^* \stackrel{def}{=} \{p_{l,k,0}^*, \mu_{l,k,0}^*, \Sigma_{l,k,0}^*\} \qquad (7)$$
$$= \arg\max_{p_{l,k,0}^*, \mu_{l,k,0}^*, \Sigma_{l,k,0}^*} \prod_{z_l \in l_0} \left[ \sum_{k=1}^{K_l} p_{l,k} G(z_l; \mu_{l,k}, \Sigma_{l,k}) \right]$$

where l ∈ {fg,bg} indicates foreground or background; $z_l$ are the features of the pixels having label l. The problem with video segmentation is how to propagate these SCGMM models over the rest of the sequence, since both the foreground and for $I_t$, and update the SCGMM models background objects can be constantly moving.

The following general problem is considered. Suppose at time instance t−1, the parameters of the foreground and background SCGMM models have been learned as $\theta_{l,t-1}$= $(p_{l,k,t-1}, \mu_{l,k,t-1}, \Sigma_{l,k,t-1})$, k=1, . . . , $K_l$. Given a new incoming frame $I_t$, the goal is to obtain a foreground/background segmentation $\theta_{l,t}=(p_{l,k,t}, \mu_{l,k,t}, \Sigma_{l,k,t})$, k=1, . . . , $K_l$. At first glance, this problem appears to be a deadlock, because in order to obtain a good segmentation, one needs an accurate SCGMM model for the current frame; and in order to get an accurate SCGMM model for the current frame, one needs a good foreground/background segmentation. The joint SCGMM tracking procedure described herein breaks this deadlock.

The SCGMM image segmentation technique looks for ways to obtain an approximate SCGMM model for the current frame before the graph cut segmentation. Inspired by color-based object trackers, it is assumed that from time t−1 to t, the colors of the foreground and background objects do not change. Hence, the color parts of the SCGMM models remain identical:

$$G(z_{c,t};\mu_{l,k,c,t},\Sigma_{l,k,c,t}) = G(z_{c,t-1};\mu_{l,k,c,t-1},\Sigma_{l,k,c,t-1}), \qquad (8)$$

where l ∈ {fg,bg} and k=1, . . . , $K_l$. The problem is how to update the spatial parts $G(z_{s,t}; \mu_{l,k,s,t}, \Sigma_{l,k,s,t})$ given the new input image $I_t$. Since a foreground/background segmentation on $I_t$ is not available at this moment, a global SCGMM model of the whole image is first formed by combining the foreground and background SCGMM models of the previous frame with the corresponding weights relative to the coverage size of foreground and background regions in the previous frame, i.e., define:

$$\theta_{I,t}^0 \stackrel{def}{=} \{\theta_{fg,t-1}, \theta_{bg,t-1}, \gamma_{fg,t-1}, \gamma_{bg,t-1}\}, \quad (9)$$

where superscript 0 indicates that the parameter set will serve as the initialization value for the later update. $\gamma_{fg,t-1}$ and $\gamma_{bg,t-1}$ represent the weights or covered areas of the foreground and background regions in the previous segmented frame, and they satisfy $\gamma_{fg,t-1}+\gamma_{bg,t-1}=1$. Denote $K_I=K_{fg}+K_{bg}$ as the number of Gaussian components in the combined image level SCGMM model, where it is assumed that the first $K_{fg}$ Gaussian components are from the foreground SCGMM, and the last $K_{bg}$ Gaussian components are from the background SCGMM. The image SCGMM model can be written as:

$$p(z_t \mid \theta_{I,t}^0) = \gamma_{fg,t-1} p(z_t \mid \theta_{fg,t-1}) + \gamma_{bg,t-1} p(z_t \mid \theta_{bg,t-1}) \quad (10)$$

$$= \sum_{k=1}^{K_I} p_{k,t}^0 G(z_{s,t}; \mu_{k,s,t}^0, \Sigma_{k,s,t}^0) G(z_{c,t}; \mu_{k,c,t}, \Sigma_{k,c,t}).$$

Note the last term is Equation 8. The Gaussian component weights $p_{k,t}^0, k=1, \ldots, K_I$ are different from their original values in their respective foreground or background SCGMMs due to the multiplications of $\gamma_{fg,t-1}, \gamma_{bg,t-1}$. Given the pixels in the current frame $I_t$, the objective is to obtain an updated parameter set, which maximizes the joint data likelihood of the whole image, i.e., $$\{p_{k,t}^*, \mu_{k,s,t}^*, \Sigma_{k,s,t}^*\} = \arg\max_{p_{k,t}^*, \mu_{k,s,t}^*, \Sigma_{k,s,t}^*} \prod_{z_t \in I_t} p(z_t \mid \theta_{I,t}) \quad (11)$$

for all k=1, . . . , $K_I$. The EM algorithm is adopted here again to iteratively update the model parameters from the initial parameter of $\theta_{I,t}^0$. However, as can be seen in Equation 11, unlike the conventional EM algorithm, where all model parameters are simultaneously updated, the spatial parameters of the SCGMM models are only updated in this phase, and the color parameters are kept unchanged. This can be easily implemented by constraining the color mean and variance to be identical to their corresponding values in the previous frame (Equation 8).

Figure 7:
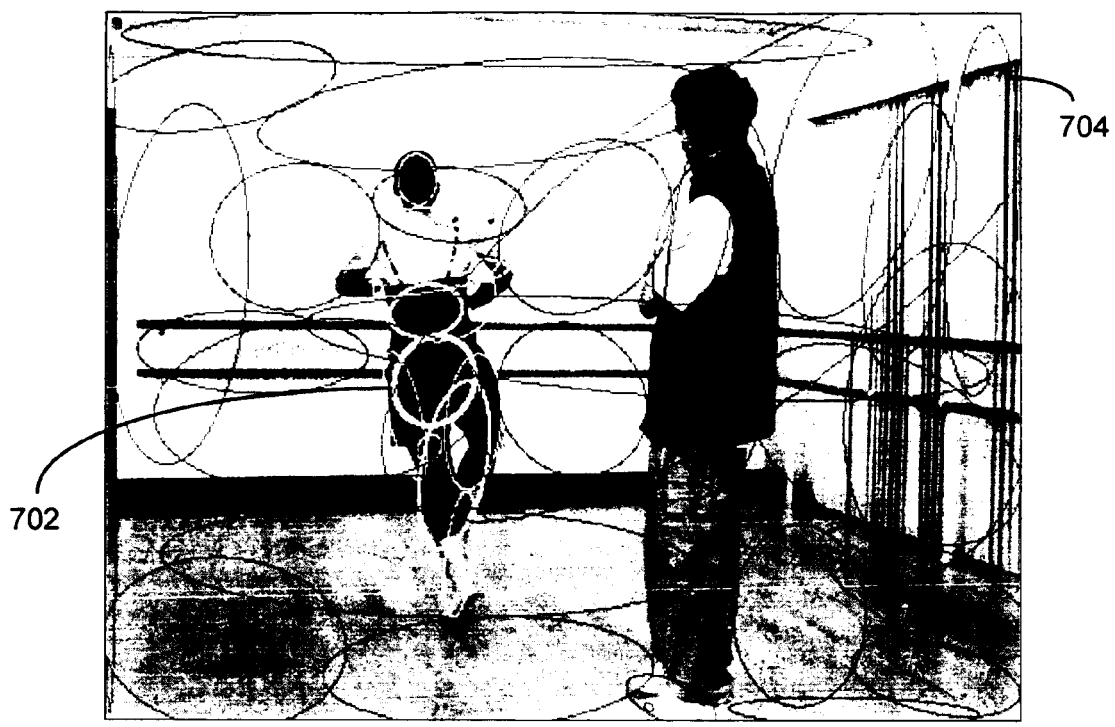
FIGS. 7 and 8 depict an example of the foreground/background joint SCGMM tracking via Expectation Maximization (EM) described herein.
Figure 8:
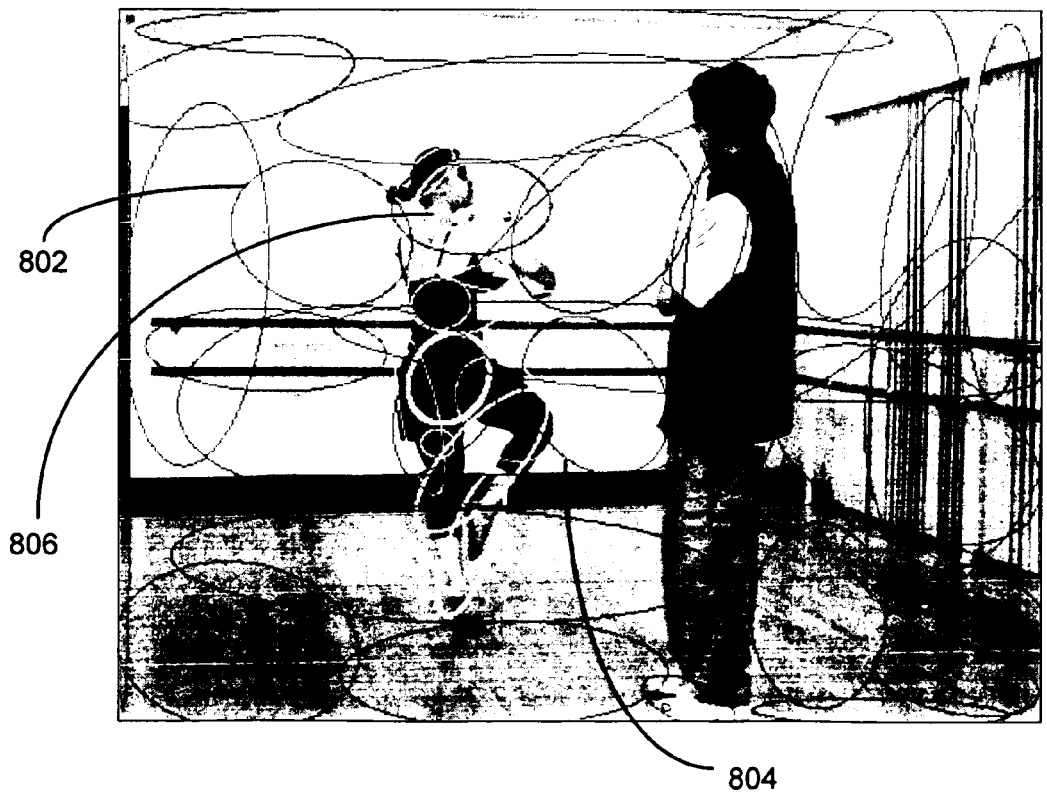

In FIGS. 7 and 8, the results of the foreground/background joint SCGMM tracking via EM are shown. Light ellipses (for example, 702) are foreground components, and dark ellipses (for example, 704) are background components. Note the expansion of the background component 1 802 and the compression of component 2 804 while the foreground person 806 rotates.

TABLE 1

The EM procedure for Foreground/Background Joint Tracking. Subscript t is ignored in the equations.

At each time instant t, the following EM procedure is performed:
1. E-step, calculate the Gaussian component assignment probability for each pixel z:

$$p^{(i)}(k \mid z) = \frac{p_k^{(i)} G\left(z_s; \mu_{k,s}^{(i)}, \sum_{k,s}^{(i)}\right) G\left(z_c; \mu_{k,c}, \sum_{k,c}\right)}{\sum_{k=1}^{K_I} p_k^{(i)} G\left(z_s; \mu_{k,s}^{(i)}, \sum_{k,s}^{(i)}\right) G\left(z_c; \mu_{k,c}, \sum_{k,c}\right)}.$$

2. M-step, update the spatial mean and variance, and the weight of each Gaussian component as:

$$\mu_{k,s}^{(i+1)} = \frac{\sum_{z \in I_t} p^{(i)}(k \mid z) z_s}{\sum_{z \in I_t} p^{(i)}(k \mid z)}.$$

$$\sum_{k,s}^{(i+1)} = \frac{\sum_{z \in I_t} p^{(i)}(k \mid z)(z_s - \mu_{k,s}^{(i+1)})(z_s - \mu_{k,s}^{(i+1)})^T}{\sum_{z \in I_t} p^{(i)}(k \mid z)}$$

$$p_k^{(i+1)} = \frac{\sum_{z \in I_t} p^{(i)}(k/z)}{\sum_{k=1}^{K_I} \sum_{z \in I_t} p^{(i)}(k \mid z)}$$

Figure 9:
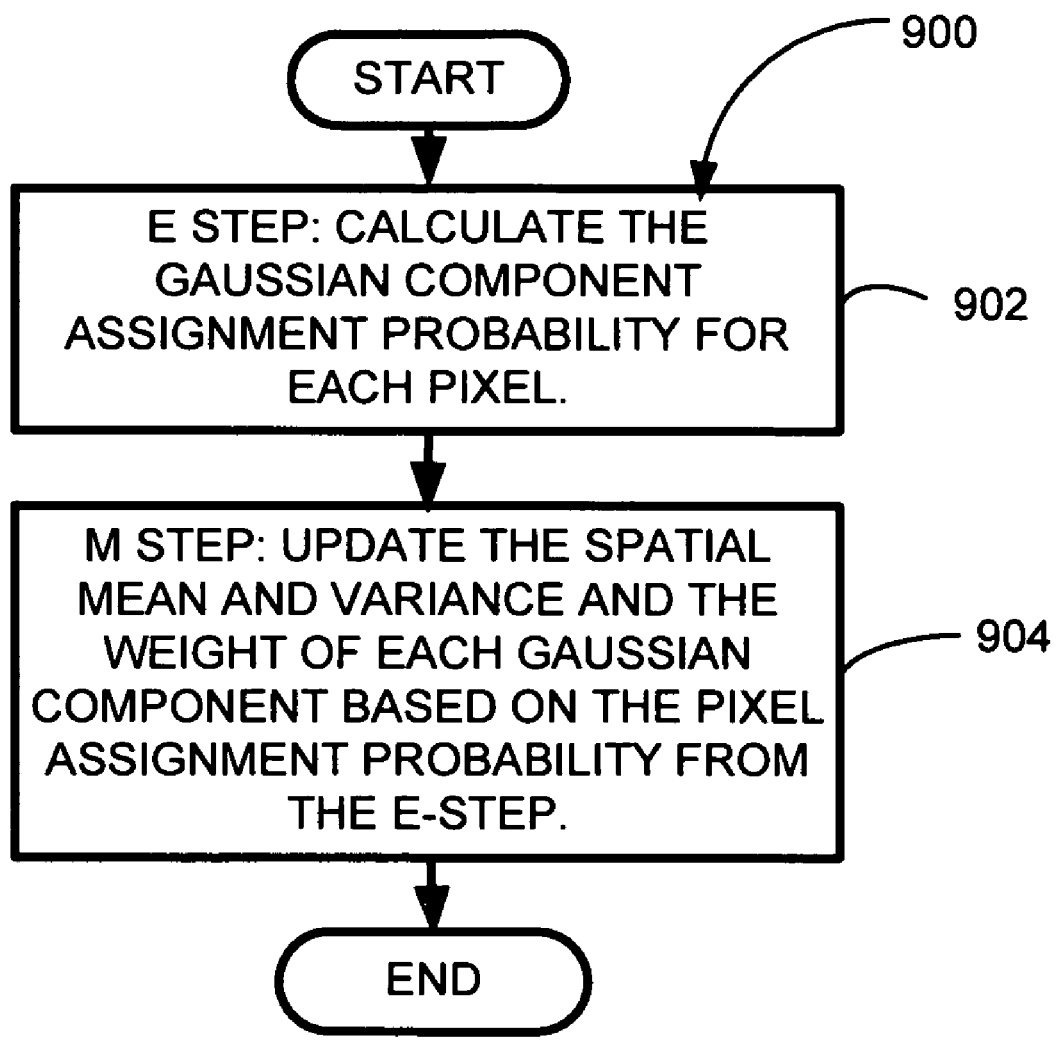
FIG. 9 depicts an exemplary flow diagram of the EM procedure for foreground and background joint tracking.

The modified EM procedure is shown in Table 1 and FIG. 9. In the E-step, the posteriori of the pixels belonging to each Gaussian component are calculated (process action 902), and in the M-step, the mean and variance of each Gaussian component in the spatial domain are refined based on the updated posteriori probability of pixel assignment from E-step (process action 904).

The above procedure shares many common characteristics with the gradient-based color tracking algorithms in literature such as mean-shift, hence the name joint SCGMM tracking. For instance, the spatial part of the SCGMM resembles the spatial kernel used in mean-shift. Both approaches are gradient based, which moves the component/object bounding box towards directions where there is more color similarity.

Compared with the existing methods, the joint SCGMM tracking procedure of the SCGMM image segmentation technique has a number of unique features. Unlike many existing algorithms that only focus on tracking the foreground objects, the present joint SCGMM tracking procedure combines the foreground and background SCGMM models into a unified model and tracks both simultaneously. The tracking is performed through maximizing the overall data likelihood of the whole image. Hence the foreground and background SCGMM models can collaborate with each other and adapt better to the change of the whole image. Since in the E-step of Table 1, the pixels are assigned to different Gaussian components based on their likelihood, the foreground and background Gaussian components are actually competing with each other to grab similar pixels. This partially solves the occlusion problem in video segmentation. Furthermore, objects with very complex colors or shapes can be tracked, thanks to the descriptive capability of the SCGMM. Additionally, the SCGMM can track highly deforming non-rigid objects.

2.4 Segmentation and Post-Updating.

After the joint SCGMM tracking, the image SCGMM model is split back into two models, one describing the foreground, the other describing the background. Components belonging to the foreground before tracking are placed in the foreground SCGMM, and components belonging to the background before tracking are placed in the background SCGMM. The two SCGMM models are then used to perform graph cut segmentation.

The segmentation results can be used for a post-updating of the SCGMM models, because now one can train the foreground and background SCGMM models separately with the segmented pixels, which often provides better discrimination power for segmenting future frames. The process is similar to what was done for the first frame (Equation 7), except that the tracked SCGMM models are used as the initialization for the optimization process, which often results in a faster convergence.

The segmentation results are not always perfect. If one believes that the foreground and background colors stay the same across the sequence, one can perform a constrained update on the two models. Basically, the updating of the foreground or background SCGMM is limited to the spatial portion of the SCGMM model, and the color means and variances are forced to be constant. More specifically, Equation 11 can be used on the foreground or background region to update the SCGMM models, forcing the color means and variances to be constant. Experiments show that this approach will often help the whole application to recover from segmentation errors.

Figure 10:
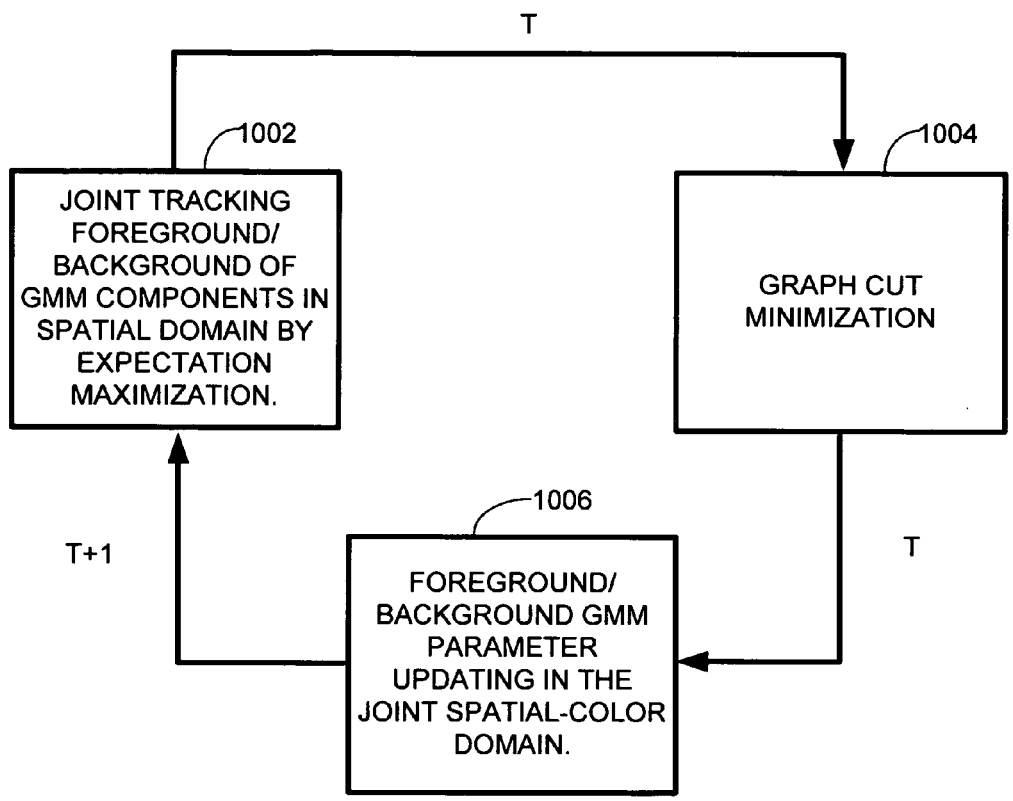
FIG. 10 depicts an exemplary flow diagram of the iterative circle of foreground/background segmentation for one frame.

To summarize, the tracking (process action 1002), segmentation (process action 1004) and updating (process action 1006) process is iterated as shown in FIG. 10. In principle, for each frame this loop can be run several times until convergence. In practice it was found that one iteration was sufficient for all of the sequences that were tested.

2.5 Automatic Foreground Extraction for Video Conferencing.

Manual initialization is not always acceptable in video foreground/background segmentation, in particular for real-time applications such as video conferencing. One possibility to automatically initialize the segmentation in a video sequence is to initialize with motion information, as the foreground is usually moving in such applications. However, another automatic initialization approach is possible assuming that it is known that the foreground is of a known object, such as, for example if the object to be segmented is the head and shoulders of a person. An exemplary automatic initialization process is shown in FIG. 11.

Figure 12:
FIGS. 12, 13 and 14 depict the automatic initialization of the segmentation of the first frame of a video sequence.
Figure 13:
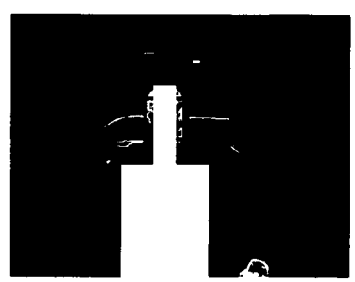
Figure 14:
Figure 11:
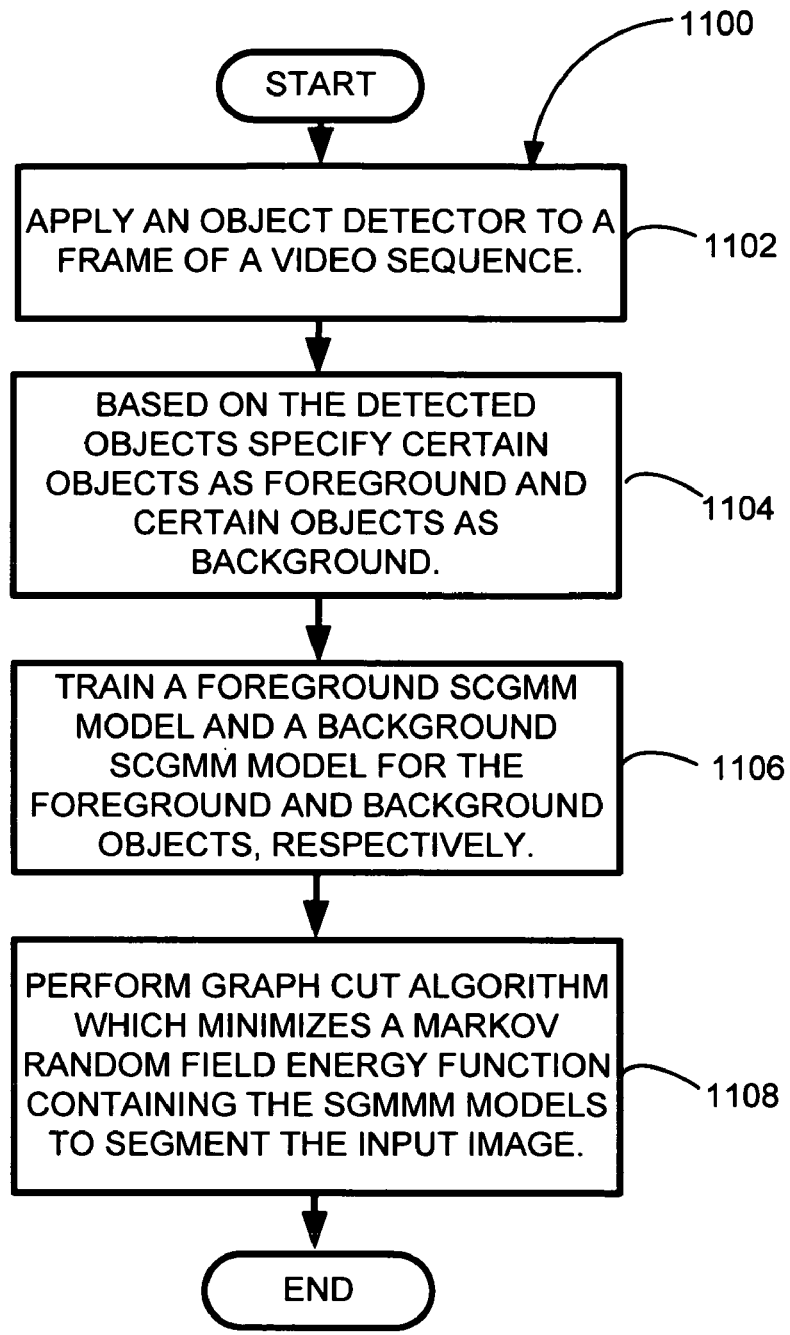
FIG. 11 depicts an exemplary flow diagram of the process of automatically segmenting an image using a face detector.

As shown in FIG. 11, process action 1102, the first step of the process is to apply a face detector to the video frame (exemplary results of this action are shown in FIG. 12). Based on the detection results, as shown in process action 1104, it is assumed that certain regions are definite foreground (shown in white in FIG. 13) and background (shown in black in FIG. 13). These play a similar role to the strokes drawn by users in interactive image segmentation where a user defines the foreground objects. For instance, the middle of the detected face rectangle is guaranteed to be foreground; the shoulders are likely to be a slightly expanded region below the detected face. Similarly, the areas to the left, right and above all expanded face rectangles are assumed to be background (the black areas in FIG. 13). As shown in process action 1106, two SCGMM models are trained from the pixels covered by the definite foreground and background regions, and a graph cut segmentation is performed (process action 1108). This results in the exemplary segmentation of the image shown in FIG. 14. The segmentation is not perfect. However the segments are sufficient to initialize the segmentation for the whole image sequence. As noted previously, it should be noted that the exemplary process shown in FIG. 9 can be applied to other objects by employing other object detectors.

It should be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A process for segmenting an image of an image sequence, comprising the process actions of:
    using a computing device for:
    (a) designating foreground regions in an initial image of an image sequence;
    (b) defining certain regions of the initial image as foreground and certain regions of the initial image as background based on the designated foreground regions;
    (c) learning a foreground spatial-color Gaussian Mixture Model (SCGMM) model which describes the foreground regions and background SCGMM model that describes the background regions of the initial image, wherein the SCGMM is defined in spatial coordinates and color space;
    (d) segmenting the initial image using a graph cut procedure which minimizes a Markov random field energy function containing the learned foreground and background SCGMM models;
    (e) inputting a next image of the image sequence;
    (f) updating the foreground and background SCGMM models using a joint SCGMM tracking procedure, wherein only the spatial parameters of the foreground and background SCGMM models are updated while the color parameters remain unchanged from a previous image in the image sequence, wherein updating the foreground and background SCGMM models using the joint tracking procedure comprises:
        combining the foreground and background SCGMM models of a previous image into a generative model,
        running a constrained Expectation Maximization procedure to maximize the joint likelihood of the next input image comprising fixing color components of the generative model and updating the spatial components and weights of the spatial components of the generative model, and
        separating the generative model back into an updated foreground SCGMM model and an updated background SCGMM model;
    (g) performing a graph cut procedure which minimizes a Markov Random Field energy function containing the updated foreground and background SCGMM models to segment the next image of the sequence; and
    (h) updating each of the foreground and background SCGMM models with the segmented result of process action (g).

2. The process of claim 1 further comprising repeating process actions (e) through (h) to segment subsequent images in the image sequence.

3. The process of claim 1 wherein the weights of the spatial components are determined by the percentage of the foreground and background regions.

4. The process of claim 1 wherein each said energy function minimized in a graph cut procedure comprises a two-way graph cut algorithm having two terminal nodes that represent the foreground and background SCGMM models.

5. The process of claim 1 wherein the designating process action comprises manually designating the foreground regions.

6. The process of claim 1 wherein the designating process action comprises automatically designating the foreground regions.

7. The process of claim 1 wherein the foreground regions correspond to a face and wherein the face is automatically designated by a face detector.

8. The process of claim 1 wherein the process actions (f) through (h) are repeated more than once for an input image.

9. A computer-readable storage medium having computer-executable instructions permanently stored thereon for performing the process recited in claim 1.

10. A system for segmenting a sequence of images into foreground and background regions, comprising:
a general purpose computing device;
a computer program comprising program modules executable by the general purpose computing device, wherein the computing device is directed by the program modules of the computer program to,
segment an initial image of an image sequence by identifying foreground objects in the image and using a first graph cut procedure which minimizes a Markov random field energy function containing foreground and background spatial color Gaussian Mixture Model (SCGMM) models, wherein the SCGMMs are defined in spatial coordinates and color space;
update the foreground and background SCGMM models for a next image in the image sequence using a joint SCGMM tracking procedure, wherein only the spatial parameters of the foreground and background SCGMM models are updated while the color parameters remain unchanged from a previous image in the image sequence, wherein updating the foreground and background SCGMM models using a joint tracking procedure comprises sub-modules to:
combine the foreground and background SCGMM models of a previous image with corresponding weights relative to the coverage size of the foreground and background objects of the previous image to create a generative model; and
run a constrained Expectation Maximization procedure to maximize the joint likelihood of the next image of the image sequence using the generative model comprising fixing the color factors of the foreground and background SCGMM models combined into the generative model, and updating the mean and variance portion of the spatial portion of each foreground and background model combined into the generative model; and
perform a second graph cut procedure which minimizes a Markov Random Field energy function containing the updated foreground and background SCGMM models to segment the next image of the sequence.

11. The system of claim 10 further comprising a module for updating each of the foreground and background SCGMM models with the segmented result of the next image of the sequence.

12. The system of claim 10 wherein the module to segment the initial image comprises sub-modules to:
designate foreground objects in said initial image;
define certain objects of the initial image as foreground and certain objects of the initial image as background;
learn a foreground and a background spatial-color Gaussian Mixture Model (SCGMM) model which describes the foreground objects and background objects of the initial image; and
segment the initial image using a graph cut procedure which minimizes a Markov random field energy function containing the learned foreground and background SCGMM models.

13. A process for segmenting an image of an image sequence, comprising the process actions of:
using a computing device for:
inputting an initial video frame of a video sequence;
applying an object detector to the video frame to determine known foreground objects in the video frame;
defining known objects of the video frame as foreground and known objects of the video frame as background based on the known objects detected by the object detector;
learning a foreground spatial-color Gaussian Mixture Model (SCGMM) model which describes the known foreground objects of the video frame and a background SCGMM model which describes the known background objects of the video frame, wherein the SCGMMs are defined in spatial coordinates and color space; and
segmenting the video frame using a graph cut procedure which minimizes a Markov random field energy function containing the learned foreground and background SCGMM models;
inputting a next video frame of the video sequence;
updating the foreground and background SCGMM models using a joint SCGMM tracking procedure, wherein only the spatial parameters of the foreground and background SCGMM models are updated while the color parameters remain unchanged from a previous video frame in the video frame sequence, wherein updating the foreground and background SCGMM models using the joint tracking procedure comprises:
combining the foreground and background SCGMM models of a previous video frame into a generative model,
running a constrained Expectation Maximization procedure to maximize the joint likelihood of the next input video frame comprising fixing color components of the generative model and updating the spatial components and weights of the spatial components of the generative model, and
separating the generative model back into an updated foreground SCGMM model and an updated background SCGMM model;
performing a graph cut procedure which minimizes a Markov Random Field energy function containing the updated foreground and background SCGMM models to segment the next video frame of the sequence.

14. The process of claim 13 wherein the object detector is a face detector and wherein the detected object is a face.

15. The process of claim 13 wherein the Markov random field energy function is minimized by a graph cut algorithm with two terminal nodes that represent the foreground and the background.

16. A computer-readable storage medium having computer-executable instructions permanently stored thereon for performing the process recited in claim 13.

* * * * *